Figure 1:
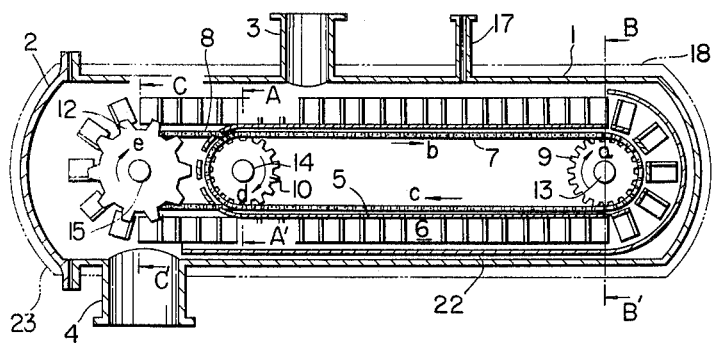

March 8, 1966  TOYOTSUGU YAMASHITA ET AL  3,239,316
CONTINUOUS REACTION APPARATUS Filed Nov. 27, 1963 4 Sheets-Sheet 1

INVENTORS
TOYOTSUGU YAMASHITA
SEIJI UNO
ITARU NAKAMURA
HIROSHI FUJIMOTO
BY
ATTORNEY

United States Patent Office 3,239,316
Patented Mar. 8, 1966

3,239,316
CONTINUOUS REACTION APPARATUS
Toyotsugu Yamashita, Seiji Uno, Itaru Nakamura, and Hiroshi Fujimoto, Yamaguchi-ken, Japan, assignors to Teijin Limited, Osaka, Japan
Filed Nov. 27, 1963, Ser. No. 326,602
Claims priority, application Japan, Dec. 5, 1962, 37/54,695
6 Claims. (Cl. 23—284)

This invention relates to a continuous reaction apparatus for lump, granular or powdery chemical substance. This invention relates particularly to a continuous reaction apparatus for reacting continuously and effectively lump, granular or powdery solid as in the reaction for forming aromatic di- or poly-carboxylate from aromatic mono- or di-carboxylate. Abve all, it is suitable as a reaction apparatus for the production of dialkali terephthalate by Henkel rearrangement reaction.

As a reaction apparatus for carrying out such a reaction as mentioned above, there have been previously employed in general those of batch type and continuous travelling member type.

These types of apparatuses, however, have the following defects.

In the batch type apparatus:

(1) The operation calls for big manpower, which therefore involves the high operating expenses.
(2) Because of poor stability of the reaction conditions, the resultant product shows irregularity in quality.
(3) Because of the low capability of a unit apparatus, there is a necessity of employing an increasing number of apparatuses, which results in a high cost of equipment and the larger area for installation.
(4) With the increasing number of the apparatus, there are more parts that get out of order, and also much likelihood of an accident.

In the continuous travelling type apparatus:

(1) Because only part of the space within the reactor is available, the equipment is great for its capability, which results in the high cost of equipment and the large area for installation.
(2) The material has to be previously treated in order to make it easy for the reaction product to separate from the travelling member of the reaction apparatus.
(3) When the detachment is uncertain, the reaction product is accumulated on the travelling member. Therefore, a disposal capacity of the travelling member decreases and the accumulated reaction product stays longer thereon, thereby causing accelerated decomposition reaction and the decreased yield.

This invention is a continuous reaction apparatus comprising a reactor which is equipped with a material feeder and a reaction product outlet respectively set up in the upper part and lower part thereof, said reactor having therein an endless travelling member which consists of the series of many unit receivers each made up of at least two side plates and a bottom plate which is positioned independently thereunder, said side plates and bottom plate being forced to move by an endless driving means in such a manner that the side plate and bottom plate travel at the same linear speed, said side plates having a larger period than said bottom plate, means for extruding the reaction product present in said unit receivers which is mounted between a smaller period bottom plate driving means and a larger period side plate driving means, said reaction product outlet being positioned under said extruding means. It remedies the various defects which said conventional apparatuses possess.

Hereinafter, the object, function and effectiveness of the present invention will be explained in detail by the figures and explanations, but the present invention is by no means limited by the following descriptions. Constructions in the apparatus which may be devised upon the spirit of the present invention also fall into the scope of the present invention.

Figure 2:
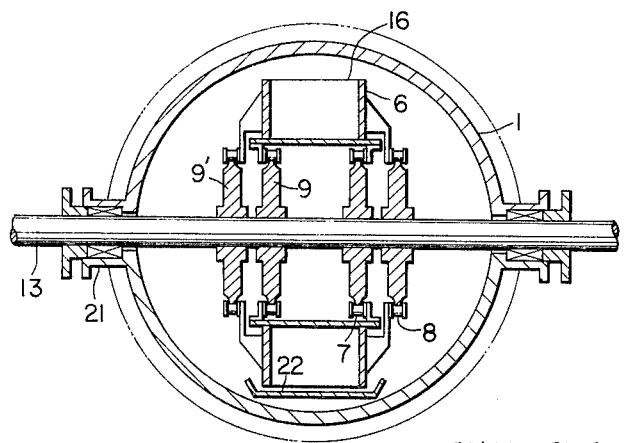
Figure 3:
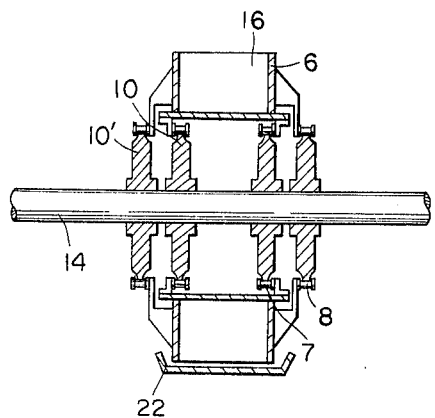
Figure 4:
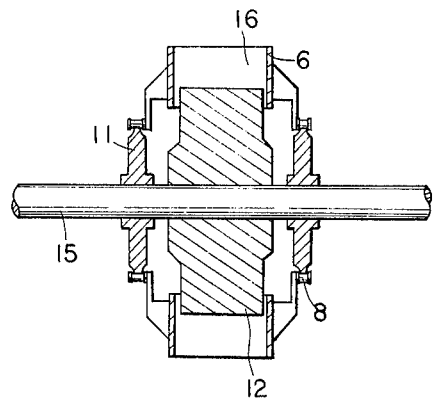
Figure 5:
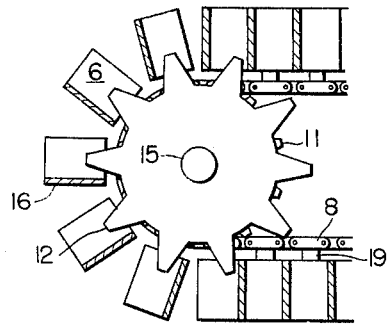
Figure 6:
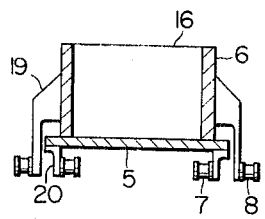
Figure 7:
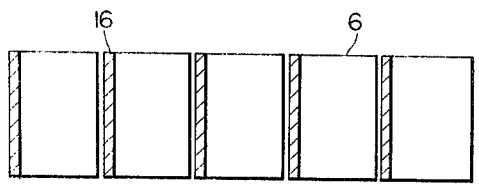
Figure 8:
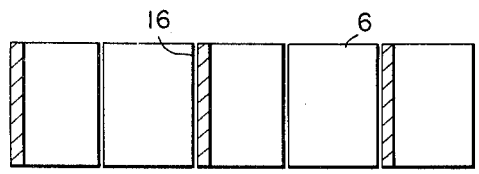
Figure 9:
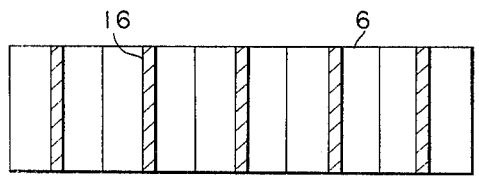
Figure 10:
Figure 11:
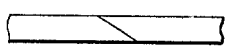

In the drawings:

FIG. 1 is a front view in vertical section.
FIG. 2 is a view in cross section taken on the line B–B' of FIG. 1.
FIG. 3 is a view in cross section taken on the line A–A' of FIG. 1.
FIG. 4 is a view in cross section taken on the line C–C' of FIG. 1.
FIG. 5 is an enlarged view of the part around the extruding wheel of FIG. 1.
FIG. 6 is an enlarged view showing the relation between the bottom plate and the side plates.
FIGS. 7–9 are views in lateral section showing how the partition plates are adapted to be mounted to the side plates.
FIGS. 10–11 are views showing how the bottom plates and side plates are interlocked with each other.

In the upper part of a cylindrical reactor 1 closed by a reactor hood 2 are a material feeder 3 and a gas inlet 17 and a reaction product outlet 4 is situated in the lower part thereof. The reactor is provided with rotary shafts 13, 14 and 15 passing therethrough and bearings 21 to support them on the surface thereof. The material feeder 3 and reaction product outlet 4 are both connected with vessels (not shown in the drawings), and the gas inlet 17 is connected with a gas feeder (not shown in the drawings) by means of a gas pipe (not shown in the drawings). The reactor 1 and reactor hood 2 are so designed that they may be heated from outside by heating means 18 and 23.

In reference to said shafts 13, 14 and 15 passing through the reactor, bottom plate driver chain wheel 9 and side plate driver chain wheel 9' are fixed to the shaft 13 as shown in FIG. 2; a bottom plate driver chain wheel 10 (first follower wheel) and side plate follower chain wheel 10' (second follower wheel) are fixed to the shaft 14 as shown in FIG. 3; and side plate follower chain wheel 11 (third follower wheel) and extruding wheel 12 for the reaction product are fixed to the shaft 15. In order to equalize the linear speed of the bottom plate 5 and side plate 6, it is so designed that 9 and 9', 10 and 10' have respectively the same diameter.

Further as shown in FIGS. 4 and 5, the extruding wheel 12 is so adapted to be mounted that it neither touches the side plate 6 nor the below-mentioned partition plate 16, at the time of rotation. The radius from the center of the extruding wheel to the end of the tooth is longer than the distance from the shaft center to the point, where the bottom plate 5 is contiguous to the side plate 6, that is, the distance from the center of the shaft 15 to the tooth end of the wheel 12 is longer, and in addition, the top of the tooth is more narrow than the distance between the side plates and also between the succeeding partition plates, said tooth tapering outwardly.

As shown in FIG. 6, the bottom plate 5 is fixed to two bottom plate driving chains 7 by means of a bottom plate supporting arm 20.

The bottom plate driver chain 7 is attached over bottom plate driver chain wheels 9 and bottom plate follower chain wheels 10, as shown in FIGS. 2 and 3. Two side plates 6 are fixed to bottom plate driver chain 8 respectively by means of a side plate supporting arm 19. The side plate driver chain 8 is, as shown in FIGS. 2, 3 and 4, stretched over side plate driver chain wheels 9' and 10' and side plate follower chain wheel 11.

The bottom plate driver chain 7 is stretched over bottom plate 5, bottom plate supporting arm 20, bottom plate driver chain 7, bottom plate driver wheel 9 mounted on the shaft 13, bottom plate follower wheel 10 mounted on the shaft 14; while the side plate driving means is made up of side plate 6, side plate supporting arm 19, side plate driver chain 8, side plate driver wheel 9' which is mounted on the shaft 13 coaxially with the wheel 9, side plate follower wheel 10' which is mounted on the shaft 14 coaxially with wheel 10 and the side plate follower wheel 11 which is mounted on the shaft 15. The bottom plate driving means and side plate driving means move the series of unit receivers, each made up of side plates and bottom plate, or each made up of a bottom plate and a channel-shaped body consisting of two side plates and a partition plate 16, at the same speed, and after changing the direction vertically, they begin to travel in the opposite direction to the initial one. When the bottom plate driving means is compared with the side plate driving means, it is apparent from the drawing that a unit bottom plate starting from a certain position returns to the original position with a smaller travelling period than that of a unit side plate.

The bottom plate 5 and side plate 6 are forced to move from under the material feeder 3 in the direction of arrow (b) by means of the bottom plate driver chain 7 and side plate driver chain 8 when the shaft 13 is turned in the direction of arrow (a) and are further turned 180° by bottom driver chain wheel 9 and side plate driver chain wheel 9' which are rotating in the direction of arrow (a) and still further moved in the direction of arrow (c). The bottom plate 5 returns to the original position under the material feeder 3 by turning 180° by means of the bottom plate follower chain wheel 10 rotating in the direction of arrow (d), and the side plate 6 is further forced to proceed straightforwardly by means of the side plate follower chain wheel 10', and thereafter is rotated in the direction of arrow (e) by means of the side plate follower chain wheel 11 to turn the direction 180°. It is further forced to proceed straightforwardly by means of the side plate follower chain wheel 10' to return to the point under the material feeder 3. As shown in FIGS. 7, 8 and 9, the side plates 6 are provided with partition plates 16 positioned at a right angle with the direction of the movement. As shown in FIGURES 2 and 3, guide 22 is so formed that both sides thereof hold the side plates 6 from the outside. Further, the guide is arranged so as to extend from the upper turning position of the bottom plate to just before the outlet 4 so that it may receive the reaction product that has fallen off from the receivers during and after the change of their direction on the side of shaft 13 (see FIGURE 1).

Next, the function of the present invention is explained. The material (e.g. salt of phthalic acid) which is supplied from the material feeder 3 of the reactor 1 heated by means of heaters 18 and 23 is kept in the series of unit receivers each made up of the bottom plate 5 and side plates 6 or each made up of the bottom plate and side plates and the partition plate 16. Thus the material is heated by the heaters 18 and 23 through the medium of the reactor 1 and reactor hood 2 and while the material is moving from under the material feeder 3 in the direction of arrow (b), the reaction is accelerated in the presence of gas supplied from the gas inlet 17 by application of heat from outside, whereby the material is formed into a mass or masses.

Therefore, even when the bottom plate 5 and side plate 6 are forced to turn upside down by the bottom plate driver chain wheel 9 and the side plate driver chain wheel 9', the reaction product travels in the direction of arrow (a), remaining stuck to the bottom plate 5 and side plate 6. When, owing to vibration, crumbling, etc., the reaction product comes off from the bottom plate 5 and side plate 6, it falls on the guide 22 and is conveyed in the direction of arrow (c) thereafter being discharged from the reaction product outlet 4.

Also the reaction product, which has changed its moving direction 180° by the force of the bottom plate driver chain wheel 9 and side plate driver chain wheel 9', travels in the direction of arrow (c) while being kept stuck by melting to the bottom plate 5, side plate 6 and partition plate 16. After the bottom plate 5 has been detached from the side plates by the revolution of the bottom plate follower chain wheel 10, the reaction product is forced to come off from the side plate 6 and partition plate 16 by the extruding wheel 12 mounted on the shaft 15 coaxially with the side plate follower chain wheel 11 and is then discharged from the reaction product outlet 4.

The partition plate 16 divides the supplied materials and makes it easy for the receivers to change the direction of the movement at the position of the shaft 13 when said receivers turn 180° at the position of the shaft 13. Other advantages thereof are that it makes it easy for the extruding wheel 12 to extrude the reaction product and that the proper setting of the distance between the partition plates makes it possible for the extruded reaction product to have less than a certain size.

The present invention is applicable to, for instance, the reaction that forms aromatic di- or poly-carboxylate from aromatic mono- or di-carboxylate, the so-called Kolbe-Schmitt reaction which forms alkali salt of salicylic acid from alkali salt of phenol, or to the reaction that forms alkali salt of parahydroxybenzoic acid from alkali salt of salicylic acid or alkali salt of phenol. The present invention is particularly effective as the reaction apparatus with which di-alkali terephthalate is formed by heating mono- or di-alkali benzoate or phthalate in the presence of an inert gas, such as carbon dioxide gas, (British patent specification No. 747,207) to 300–500° C. (the so-called Henkel reaction). The alkali metal salt used in the invention may be, for example, sodium salt and potassium salt.

The following is an explanation of the case of applying the apparatus of the present invention to said Henkel rearrangement reaction.

In reference to FIG. 1, when di-potassium phthalate is fed into the reactor in the form of powder or in a suitable shape previously arranged by molding, it is continuously accumulated in the series of many top-opening receivers with channel section, adjacent with each other, each made up of the side wall plates 6, and partition plate 16 and while being forced to move inside the apparatus heated to about 360–460° C. following the movement of the bottom plate 5, side plates 6 and partition plate 16 in the direction of arrow (b), it sticks by melting to each other, and the rearrangement reaction proceeds simultaneously. When both side plates 6 and the united partition plate 16 reach the upper part of the shaft 13, the receivers separate from each other, as shown in the drawing, following the rotation of the shaft 13 in the direction of arrow (a). At this point, part or most of the adhered reaction product is detached from the partition plate 16 and/or both side wall plates 6. The completely detached reaction product in lump form travels on the lower part of the apparatus in the opposite direction to the initial one following the movement of the bottom plate 5, both side plates 6 and partition plate 16 in the direction of arrow (c) while being supported by the guide 22 and is thereafter taken out from the reaction product outlet 4. The reaction product in lump form (mainly consisting of dipotassium terephthalate) which has not been completely detached so far is extruded by the extruding wheel 12 and taken out from the outlet 4. The same operation with that described above is applicable when other aromatic alkali mono- or di-carboxylate is used as material in place of dipotassium phthalate.

As so far mentioned, the present invention has the following excellent advantages, removing off the defects in the prior type.

While in conventional reactors having endless travelling members, only the upward portion of the travelling member is available for reaction in the reactor. In accordance with the present invention, the material is continuously under reaction conditions in the reactor even after the travelling member is passed into the lower part of the reactor. The portion that participates in the reaction is, therefore, twice as much as that in the conventional reactor.

There is a marked improvement on the yield of the product and on the capacity of the apparatus. Owing to the 180° turn at the position of the shaft 13, a relative motion takes place respectively among the bottom plates, the side plates and the partition plates, thereby the reaction product being automatically detached. Said detachment is made sure by the reaction product extruding wheel, leaving less product inside the receiver.

What we claim is:

1. A continuous reaction apparatus comprising a reactor having upper and lower walls, a material feeder and a reaction product outlet positioned in said upper and lower walls of said reactor, respectively, said reactor further including an endless travelling member positioned within said reactor, which consists of a series of unit receivers made up of at least two side plates and a separate bottom plate, said series of side plates and said series of bottom plates being independently driven by driving means, whereby the side plate and bottom plate travel at the same linear speed, means for extruding the reaction product contained in said unit receivers mounted between the lines of travel of the series of side plates and positioned above said reaction product outlets and guide means positioned on the lower wall of the reactor for receiving reaction products from the receivers during and after the change of their direction on the side of the said shafts.

2. A continuous reaction apparatus according to claim 1, further comprising gas inlet means positioned in the said upper wall of the reactor.

3. A continuous reaction apparatus according to claim 1, further comprising heating means mounted along the outer surface of the upper and lower walls of the reactor.

4. A continuous reaction apparatus according to claim 1, wherein each receiver comprises a channel-type body which includes at least two side plates and a partition plate mounted on the lateral end thereof and a separate bottom plate.

5. A continuous reaction apparatus according to claim 1, wherein the bottom plate driving means includes a first driving wheel and follower wheel, respectively, fixed to first and second parallel shafts respectively set in substantially horizontal planes, whereby the said bottom plates are moved continuously, side plate driving means including a second driving wheel and follower wheel, respectively, mounted coaxially on the said parallel shafts with the said first driving wheel and follower wheel of the bottom plate driving means, whereby the said side plates are moved continuously, and a third follower wheel mounted to a third shaft parallel to the said shafts and in the same horizontal plane thereof and being positioned outside the said first and second shafts.

6. A continuous reaction apparatus according to claim 5, wherein said extruding means includes an extruding wheel mounted on the said third shaft, said wheel having teeth mounted on the periphery thereof, the radius from the center of the said wheel to the end of each of said teeth being longer than the distance from the shaft center to the point to where the bottom plate is continuous to the side plate.

References Cited by the Examiner

UNITED STATES PATENTS 1,551,646    9/1925    Davidson _____ 25—99
3,066,351   12/1962    Schriner _____ 18—4 X MORRIS O. WOLK, *Primary Examiner.*

JAMES H. TAYMAN Jr., *Assistant Examiner.*